March 23, 1948.
C. H. ZIMMERMAN
2,438,309
CONTROL DEVICE FOR AIRPLANES
Filed April 11, 1944
2 Sheets-Sheet 1
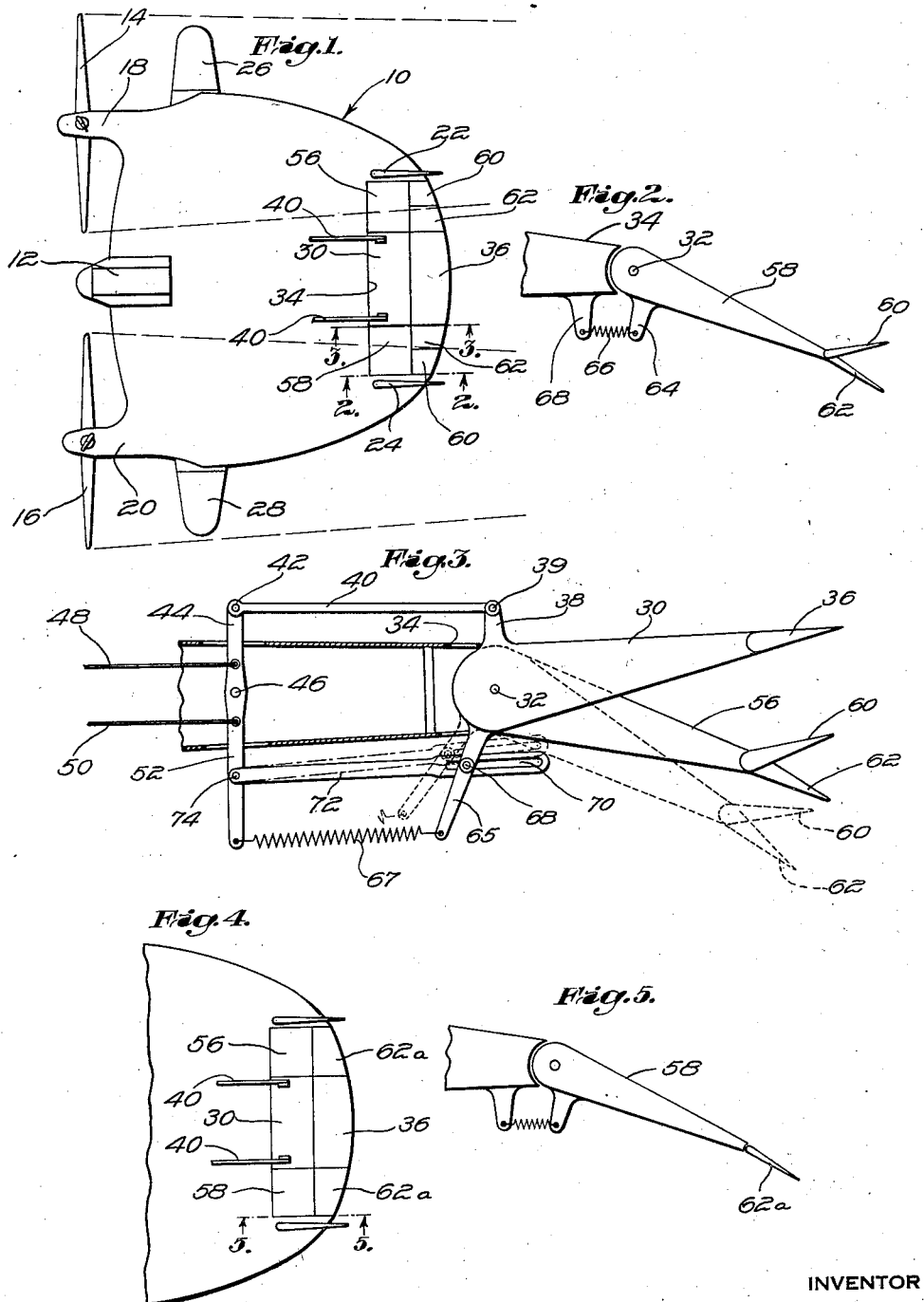
INVENTOR
Charles H. Zimmerman
BY Charles L. Shelton
Attorneys March 23, 1948.  C. H. ZIMMERMAN  2,438,309
CONTROL DEVICE FOR AIRPLANES
Filed April 11, 1944  2 Sheets-Sheet 2
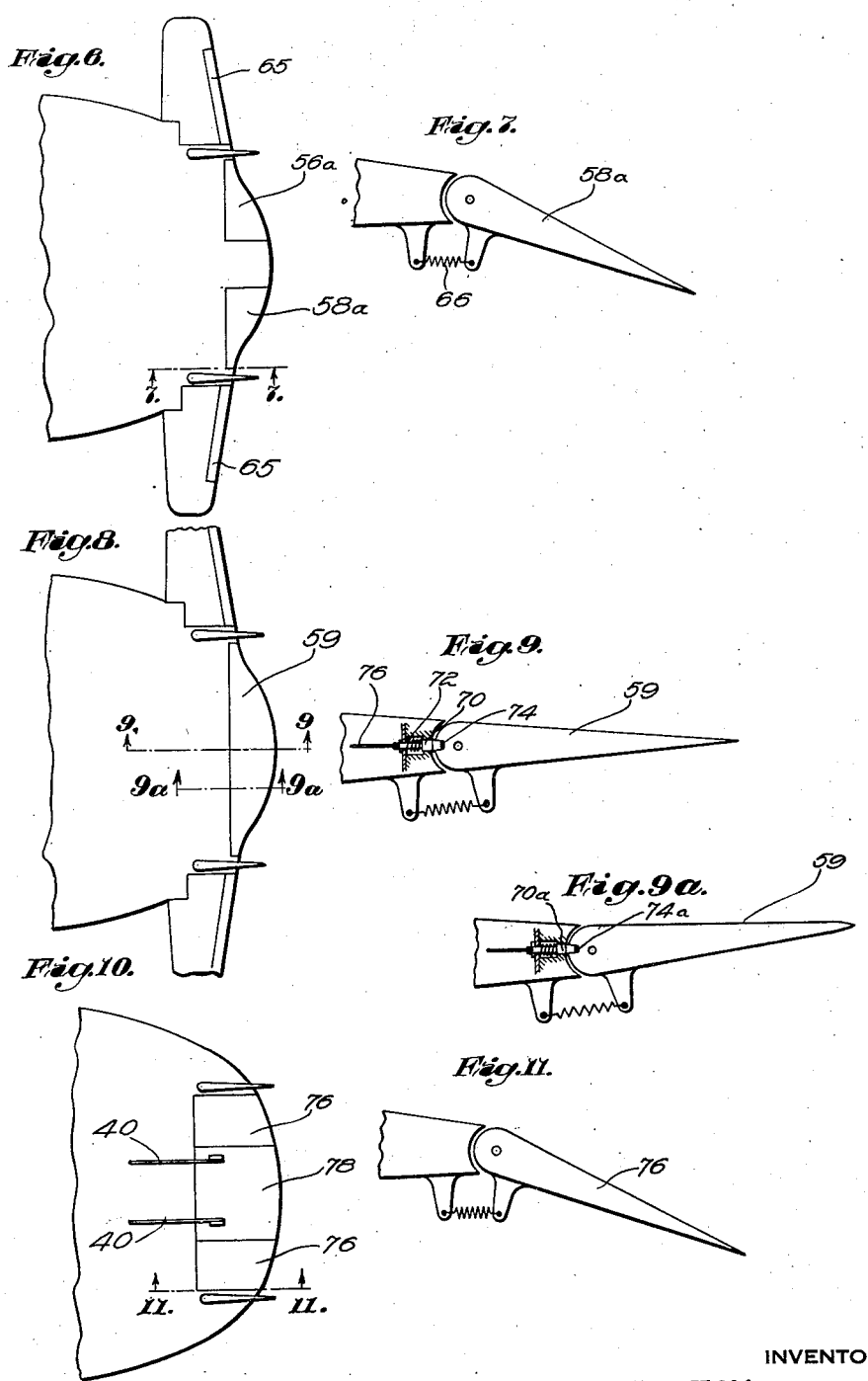
INVENTOR
Charles H. Zimmerman
BY Charles L. Shelton
Attorney Patented Mar. 23, 1948

2,438,309

UNITED STATES PATENT OFFICE 2,438,309

CONTROL DEVICE FOR AIRPLANES

Charles H. Zimmerman, Nichols, Conn., assignor to United Aircraft Corporation, East Hartford, Conn., a corporation of Delaware Application April 11, 1944, Serial No. 530,541

14 Claims. (Cl. 244—13)

1

This invention relates to improvements in control devices for aircraft of the low aspect ratio all-wing type, and has particular reference to improved means for providing longitudinal stability and good maneuverability in such craft throughout the entire speed range of flight and also for overcoming the undesirable change in trim speed which normally results from change in engine power.

It is an object of this invention to provide automatic means for overcoming the inherent longitudinal instability of low aspect ratio all-wing airplanes in the high speed range; and more specifically to provide automatically operative stabilizing flaps for this purpose which are located wholly within the normal plan outline of the wing.

A further object of the invention is to provide means operative automatically upon operation of the elevator surfaces for rendering said stabilizing flaps inoperative as stabilizing flaps and operative as elevator flaps at low speeds.

A further object of the invention is to overcome automatically the change in trim speed which results from a change in engine power output.

A still further object is to provide means for making the low aspect ratio all-wing airplane longitudinally stable and readily maneuverable throughout the entire speed range while also eliminating changes in trim speed with changes in engine power.

A still further object of the invention is to provide improved control devices for a low aspect ratio all-wing airplane operated by a single pilot actuated control member to control automatically both the pitching and rolling moments of the plane.

A yet further object is generally to improve the construction and operation of low aspect ratio all-wing airplanes.

In the drawings:

Fig. 1 is a plan view of a low aspect ratio all-wing airplane of the character indicated above showing the application thereto of automatic stabilizing surfaces and control mechanism associated therewith for improving the maneuverability of such planes at low speeds, improving the longitudinal stability at speeds above such low speeds, and eliminating changes in trim speed with changes in engine power.

Fig. 2 is a view taken on line 2—2 of Fig. 1.

Fig. 3 is a view taken on line 3—3 of Fig. 1.

Fig. 4 is a view similar to Fig. 1, with part of the wing broken away showing a somewhat modified form of control surfaces.

2

Fig. 5 is a view on line 5—5 of Fig. 4.

Fig. 6 shows a modified construction in which the ailerons and elevators are located outboard and near the trailing edge of the wing.

Fig. 7 is a view on line 7—7 of Fig. 6.

Fig. 8 is a view somewhat similar to Fig. 6 showing a modified construction.

Fig. 9 is a view on line 9—9 of Fig. 8.

Fig. 9a is a view similar to Fig. 9 with the stabilizing surface in a different position.

Fig. 10 is a view similar to Fig. 4 showing a further modification, and

Fig. 11 is a view on line 11—11 of Fig. 10.

In Figs. 1, 2 and 3 of the drawings, the numeral 10 indicates generally the all-wing portion of the airplane, which wing portion may contain the pilot compartment 12 as well as compartments for one or more engines (not shown) for driving the oppositely rotatable propellers 14 and 16. These propellers are disposed somewhat ahead of the wing portion 10 on opposite sides thereof and are supported by forwardly projecting nacelles 18 and 20 extended from the wing portion at the lateral extremities thereof. The wing portion may also be provided with widely spaced vertical fin surfaces 22 and 24 adjacent the trailing edge thereof.

Projecting laterally from each side of the wing portion 10 just back of the leading edge and at the tips thereof are floating ailerons 26 and 28 adapted to be actuated by lateral movements of the control stick (not shown) to control the rolling moment of the ship.

Also a plurality of trailing edge control surfaces are provided, all of which are disposed within the normal plan outline of the wing. These surfaces comprise a centrally located elevator 30 in the form of a flap hinged at its forward edge (Fig. 3) at 32 adjacent a re-entrant trailing edge portion 34 of the wing. The trailing edge portion of the elevator flap 30 is provided with a conventional trim tab 36. The flap 30 is also provded with a pair of upstanding horns 38 pivoted at 39 to links 40 which are pivotally connected at 42 with generally vertically disposed levers 44 pivotally mounted at 46 on the main body of the wing. Control cables 48 and 50 connected to the control stick (not shown) are oppositely horizontally movable by fore and aft movements of the stick and are connected to levers 44 above and below their pivots 46 to move the elevator flap 30 in opposite directions below and above its neutral position in a usual manner.

At high cruising speeds a low aspect ratio all-wing airplane is longitudinally unstable for practicable locations of the center of gravity. By low aspect ratio is meant any airplane having an aspect ratio of 3 or less. This instability is such that if, for any reason, the airplane is disturbed from its trim speed it will depart farther and farther from that trim speed rather than tending to return to it. Hitherto, this longitudinal instability has been corrected by providing laterally projecting stabilizing surfaces designed to provide the required stability and control under the control of the pilot.

In accordance with the present invention, longitudinal stability at moderate and high speeds is provided by automatically operative stabilizing flaps disposed in the recess formed by the reentrant trailing edge portion 34 and located on opposite sides of the central elevator flap 30. As shown in Figs. 1 and 2, these stabilizing flaps comprise airfoil flap sections 56 and 58 pivoted about the hinge line 32 for flap 30 and each having an upturned trailing edge tab 60 and a downturned trailing edge tab 62 which are on the same hinge line as the trim tab 36 on elevator flap 30. The tabs 60 and 62, while angularly adjustable relative to surfaces 56 and 58, are adapted to be fixed in their adjusted relationship. It will be observed that the downwardly deflected tabs 62 are located adjacent the trim tab 36 of elevator 30 out of the propeller slipstreams while the upwardly deflected tabs 60 are located outboard therefrom substantially in the slipstreams of the oppositely rotating propellers 14 and 16.

The stabilizing flaps 56 and 58 are each provided with a depending horn 64, the lower extremity of which is connected by a tension spring 66 with a similar horn 68 depending from the main surface of the wing slightly forward of the edge portion 34 of the wing recess in which the flaps are located. It will thus be evident that the springs 66 tend to pull the stabilizing flaps 56 and 58 constantly in a downward direction in opposition to air loads acting on the flaps themselves and on the stabilizing tabs 62.

At low speeds, i. e., at speeds below that for which the slope of the fixed airfoil pitching movement curve is zero, the low aspect ratio all-wing plane is stable. In fact, at the lowest speeds it is desirable to make the plane less stable or, in effect, less stiff and more maneuverable. As shown in Fig. 3, automatic mechanism may be provided for connecting the outboard stabilizing flaps 56 and 58 with the central pilot operated control flap 30 so that these stabilizing flaps will move with surface 30 as additional pilot operated control surfaces, whenever the upward travel of control surface 30 exceeds a value corresponding to trim at the point of zero slope of the main airfoil pitching moment. To this end an elongated horn 65 may be provided adjacent the flap 30 on each of the stabilizing flaps 56 and 58 which is connected at its lower end by a tension spring 67 to the end of a depending extension 52 of lever 44. The horn 65 has a pin 68 intermediate its length slidable in an elongated slot 70 in a horizontally disposed thrust link 72 which is pivotally connected at its forward end to the lever 44 at 74. The relation of the slot 70 relative to pin 68 is such that at very low air loading on the stabilizer flap 56 and its stabilizing tab 62 the pin 68 will be disposed in the forward end of slot 70, i. e., in the dotted position shown in Fig. 3, so that operation of the control stick by the pilot in a direction to elevate the flap 30 will cause the two stabilizing flaps 56 and 58 to be moved upwardly with the flap 30 to supplement the latter control surface. The slot 70 is of such length, however, that at moderate and high speeds the pin 68 will be sufficiently remote from the actuating end of slot 70 so that movements of the control flap 30 by the pilot will have no effect on the automatic stabilizing action of the flaps 56 and 58. It will be understood that either the spring 66 or the spring 67 may be used, depending upon the application. In any case the use of the flap control mechanism shown in Fig. 3 including spring 67 improves controllability.

With a low aspect ratio all-wing airplane, the change from power off to power on results in a stalling moment which the pilot must overcome by the use of his controls if he is to continue flight at the original speed. Means are provided for automatically overcoming any change in trim speed resulting from a change in engine power output. This is accomplished by the combined effect of the upwardly deflected tabs 60 and the downwardly deflected tabs 62 mounted on the trailing edges of the spring biased stabilizing flaps 56 and 58. Due to the fact that the upwardly deflected tabs 60 are substantially in the slipstream from the propellers while the downwardly deflected tabs 62 are out of the slipstreams, an increase in velocity in the air flowing over tab 60 as a result of propeller thrust causes the stabilizing flaps which carry them to be moved downward, giving a diving moment which opposes the stalling moment otherwise produced on the plane as a whole due to an increase in power.

In Figs. 4 and 5 a modified construction is shown in which the stabilizing flaps 56 and 58 each have a single downwardly deflected tab 62a which extends across the entire rear edge of the flap; the upwardly deflected tab 60 of Figs. 1 and 2 being omitted. In this construction the stabilizing flaps and downturned tabs provide longitudinal stability as in the Fig. 1 construction, but will not correct for change in trim speed due to change in engine power.

In Figs. 6 and 7 a still further modified construction is shown in which the stabilizing flaps 56 and 58 of the previously described forms become 56a and 58a. In this construction, these surfaces perform simply as stabilizing flaps. Where an arresting hook is provided, it is mounted on the fixed part of the main wing between flaps 56a and 58a. Longitudinal control is obtained in this construction by the use of control surfaces 65 which project laterally from the normal plan outline of the wing adjacent the trailing edge thereof. These surfaces are in the form of "ailavators" which move in the same sense in response to fore and aft movements of the pilot's control stick to provide elevator action, while moving differentially in response to lateral movements of the stick to provide aileron action. The floating tip ailerons 26, 28 of Fig. 1 are not required when the "ailavators" are used. The construction and operation of these "ailavators" is more fully described and is claimed in a copending United States application Serial No. 689,082, filed August 8, 1946, by Carl Schultz and Samuel Avena, and assigned to the assignee of this application.

In the construction shown in Figs. 6 and 7, both the diving and pitching moment and the rolling moment of the plane are controlled by the ailavators 65.

In the modification shown in Figs. 8, 9 and 9a, all tabs are omitted and flap 59 includes the entire area of the movable tail surface. The spring biased flap 59 may operate automatically as described in connection with previous forms, or at the discretion of the pilot it may be locked in a neutral position, as shown in Fig. 9, so that it becomes an integral part of the wing surface. As shown in Fig. 9a the flap 59 may also be locked in a position five degrees above neutral attitude. Locking of flap 59 in either of these positions is accomplished by means of identical spring biased detent mechanisms. As shown in Fig. 9, a bolt 70 housed in the main wing has its tapered extremity projected by a spring 72 into engagement with the leading edge of the flap 59, and enters, in the neutral position of the flap into a flared recess 74 formed in this edge. The bolt can be withdrawn when desired by the pilot to free the stabilizer flap by means of a cable 76 attached to the forward end of the bolt. The bolt 70a shown in Fig. 9a is located adjacent bolt 70 and engages a similar recess 74a when the stabilizer flap is in the position five degrees above neutral illustrated in Fig. 9a.

The constructions shown in Figs. 6, 7, 8, 9 and 9a are described and claimed in a copending divisional application Ser. No. 780,934, filed October 20, 1947, and assigned to the assignee of this application.

Figs. 10 and 11 show a construction similar to Figs. 4 and 5 except that there are no tabs on the stabilizing surfaces 76 and elevator surface 78 shown in these figures. It will be understood that in both forms shown in Figs. 4 and 10 wing tip ailerons 26, 28 of Fig. 1 are provided for lateral control. Also, while the mechanism shown in Fig. 3, by which a stabilizing flap can be manually raised in unison with the pilot operated control surface, has not been illustrated in connection with Figs. 4 to 11 it will be evident that any of these forms of stabilizing flaps may be thus operated.

The operation of these control surfaces is as follows: assuming that the plane is flying at moderate or high speeds, air loads are acting on the stabilizing flaps 56 and 58 and their stabilizing tabs 62 in opposition to the springs 66 which are tending to pull these flaps in a downward direction. If, for any reason, the airplane exceeds the speed for which it is trimmed, the increased dynamic pressure on the downwardly deflected flaps 56 and 58 and tabs 62 causes said flaps to be deflected in an upward direction against the pressure of springs 66 to give a pitching moment to the entire airplane such as to increase the angle of attack and cause the speed to return to the trim condition. Similarly, a decrease in speed results in a larger downward deflection of the stabilizing flaps 56 and 58 to give a diving moment which results in an increase in speed to trim speed.

Thus, at high and moderate speeds which is the speed range in which the longitudinal instability of the wing is manifest, the floating spring loaded flaps together with the downwardly deflected tabs 62 provide a mechanism for automatically changing the angle of attack of the airplane to oppose any change in airplane speed from its trim condition. It will thus be evident that the stabilizing flaps 56 and 58 have no other effect on the control of the airplane than to provide longitudinal stability, the normal longitudinal control of the plane being obtained by pilot control of the flap 30 in Figs. 1, 2, 3, 4, 5, 10 and 11, and the "ailavators" 65 in Figs. 6, 7, 8 and 9.

At very low speeds, at which the low aspect ratio all-wing airplane is inherently longitudinally stable, the stabilizing flaps 56 and 58 as shown in Fig. 3, for example, are in the dotted line position in which the pin 68 on the horn 65 is disposed in the forward extremity of slot 70 in thrust link 72 so that any forward movement of control cable 48 by the pilot to move the control flap 30 upwardly will also positively move the flap 58 upwardly by the direct thrust of link 72 against pin 68. It will be evident that except at very low air speeds the pin 68 of flap 58 will be disposed so far aft in the slot 70 as to be unaffected by movements of the control flap 30 by the pilot so that flap 58 under these conditions acts solely as a stabilizing flap to provide longitudinal stability for the plane.

The provision of the upwardly deflected tabs 60 on the automatic stabilizing flaps 56 and 58 in conjunction with the downwardly deflected stabilizing tabs 62 automatically overcomes the stalling moment which results from a change from power off to power on in this type of plane. As the engine power increases, the increased propeller thrust causes the stabilizing flaps to be deflected downwardly by the propeller slipstreams, thus automatically giving a diving moment opposing the stalling moment produced on the airplane as a whole by this increase in power. Thus, in a low aspect ratio all-wing airplane, the provision of automatic stabilizing flaps 56 and 58 with their upwardly deflected tabs 60 and downwardly deflected tabs 62 provides automatic stability throughout the entire speed range while also diminishing the change in trim with change in power.

It will be evident that as a result of this invention it is made possible to provide automatically for both longitudinal stability and good maneuverability in a low aspect ratio all-wing airplane throughout its entire speed range. It will also be evident that change in trim speed as a result of change in power is automatically prevented, thus reducing the demands on the pilot while also providing increased safety in flight.

While several forms of the invention have been illustrated and described it is to be understood that the invention is not limited to the particular combinations and arrangements of elements shown, and that many changes may be made in the details of construction without departing from the scope of the invention as defined by the following claims.

I claim:

1. In a low aspect ratio airplane, a main lifting surface, an elevator pivotally attached to said main surface adjacent the trailing edge of the latter in the vicinity of the fore and aft axis of said airplane, two tractive propellers located on opposite sides of said axis ahead of the leading edge of said main surface stabilizing flaps pivotally attached to said main surface adjacent the trailing edge thereof on opposite sides of said elevator and extending outboard in opposite directions into the slipstreams from said propellers, and means for biasing said stabilizing flaps into the airstream beneath said main surface for automatically changing the angle of attack of the airplane an amount sufficient to return the latter to its predetermined trim speed upon the departure of the airplane from said trim speed.

2. In a low aspect ratio airplane, a main lifting surface, an elevator pivotally attached to said main surface adjacent the trailing edge of the latter in the vicinity of the fore and aft axis of said airplane, stabilizing flaps pivotally attached to said main surface adjacent the trailing edge thereof on opposite sides of said elevator, and means for biasing said stabilizing flaps into the airstream beneath the main surface for automatically changing the angle of attack of the airplane an amount sufficient to return the latter to its predetermined trim speed upon any departure of the airplane from said trim speed, said stabilizing flaps having tabs mounted on their trailing edges the chords of which are downwardly and rearwardly deflected relative to the chords of their supporting flaps.

3. In an airplane, a main lifting surface having a leading edge and a trailing edge, a tractive propeller located ahead of said leading edge, a stabilizing surface pivotally supported adjacent the trailing edge of said main surface, and means for biasing said stabilizing surface into the airstream beneath the main surface for automatically changing the angle of attack of the airplane an amount sufficient to return the airplane to its predetermined trim speed upon any departure of the airplane from its trim speed, said stabilizing surface having upwardly deflected tab means mounted on its trailing edge and located in the slipstream from said propeller.

4. In a low aspect ratio all-wing airplane having a leading edge and a trailing edge, two tractive propellers located ahead of said leading edge on opposite sides of the fore and aft axis of the wing and adapted to be rotated in opposite directions, an elevator flap pivotally attached to said wing adjacent said trailing edge of the latter and extended symmetrically on opposite sides of said axis, stabilizing flaps pivotally attached to said wing adjacent the trailing edge of the latter on opposite sides of said elevator, means for biasing said stabilizing flaps downwardly into the airstream beneath said wing, and upwardly deflected tabs on the trailing edges of said stabilizing flaps located in the slipstreams from said propellers.

5. In an airplane, a main lifting surface, a propeller located at the leading edge of said surface, a stabilizing surface pivotally supported adjacent the trailing edge of said main surface, and means for biasing said stabilizing surface into the airstream beneath the main surface for automatically changing the angle of attack of the airplane an amount sufficient to return the airplane to its predetermined trim speed upon any departure of the airplane from its trim speed, said stabilizing surface having upwardly and downwardly deflected tabs attached to its trailing edge, said upwardly deflected tab being located in the slipstream from said propeller and said downwardly deflected tab being located substantially out of said slipstream.

6. In an airplane, a main lifting surface, two propellers located at the leading edge of said surface on opposite sides of the fore and aft centerline of the airplane, a stabilizing surface pivotally supported adjacent the trailing edge of said main surface, and means for biasing said stabilizing surface into the airstream beneath the main surface for automatically changing the angle of attack of the airplane an amount sufficient to return the airplane to its predetermined trim speed upon any departure of the airplane from its trim speed, said stabilizing surface having a downwardly deflected tab on an inboard portion of its trailing edge which is located out of the slipstreams from said propellers and having an upwardly deflected tab on an outboard portion of its trailing edge which is located in the slipstream from one of said propellers.

7. In an airplane, a main lifting surface having a trailing edge, an elevator surface pivoted to said main surface adjacent the trailing edge thereof, a stabilizing surface pivoted to said main surface adjacent the trailing edge thereof, means for biasing said stabilizing surface downwardly into the airstream beneath said surfaces for automatically changing the angle of attack of the airplane in response to changes in the dynamic pressure of the airstream beneath said main surface, means for manually operating said elevator surface, and means actuated by said manually operative means for operating said stabilizing surface positively against its bias upon elevation of said elevator surface in a selected portion only of the range of angular positions of said stabilizing surface relative to said main surface.

8. In an airplane, a main lifting surface, an elevator surface pivotally attached to the main surface adjacent the trailing edge of the latter, a stabilizing surface pivotally attached to said main surface adjacent the trailing edge of the latter, manually operable means for moving said elevator surface, means for constantly biasing said stabilizing surface downwardly into the airstream beneath the main surface for automatically changing the angle of attack of the airplane an amount sufficient to return the latter to its predetermined trim speed upon any departure of the airplane from said trim speed, and means for operatively interconnecting said elevator surface and said stabilizing surface for joint operation throughout a selected portion only of the range of angular positions of said stabilizing surface relative to said main surface.

9. In a low aspect ratio all-wing airplane which is too longitudinally stable at low speeds and longitudinally unstable at moderate and high speeds, an elevator surface pivotally attached to said wing adjacent the trailing edge thereof, stabilizing flaps pivotally attached to said wing adjacent the trailing edge thereof on opposite sides of said elevator surface, means for manually operating said elevator surface, means for automatically biasing said stabilizing flaps into the airstream beneath said wing for automatically changing the angle of attack of the wing an amount sufficient to return the wing to its predetermined trim speed upon any departure from said trim speed, and means for positively operating said stabilizing flaps against their bias by said manually operable elevator operating means, said last mentioned means being effective only when said stabilizing flaps are in lowered positions corresponding to the range of low speeds at which said wing is too stable.

10. In a low aspect ratio all-wing airplane having a leading edge and a trailing edge, oppositely rotating tractive propellers projecting forwardly of said leading edge on opposite sides of the fore and aft axis of the wing, stabilizing flap means pivotally supported on said trailing edge having portions located adjacent the rear outboard portions of said wing in the slipstreams from said propellers, means for biasing said stabilizing flap means downward, and tab means carried by said flap means having upwardly directed fixed surfaces disposed adjacent said outboard portions and in said slipstreams.

11. In a low aspect ratio all-wing airplane having a leading edge and a trailing edge, oppositely rotating tractive propellers projecting forwardly of said leading edge on opposite sides of the fore and aft axis of the wing, stabilizing flap means pivotally supported on said trailing edge having portions located adjacent the rear outboard portions of said wing in the slipstreams from said propellers, means for biasing said stabilizing flap means downward, and tab means carried by said flap means having upwardly directed fixed surfaces disposed adjacent said outboard portions and in said slipstreams, said flap means and the tab means carried thereby being disposed within the normal plan outline of said wing.

12. In a low aspect all-wing airplane, having a leading edge and a trailing edge, oppositely rotating tractive propellers on opposite sides of the fore and aft axis of said wing, an elevator surface pivotally attached to said wing adjacent the trailing edge thereof, stabilizing flaps pivotally attached to said wing adjacent the trailing edge thereof on opposite sides of said elevator surface and in the slipstreams from said propellers, said elevator and said stabilizing flaps having tabs on their trailing edges terminating substantially within the general plan outline of said wing, means for biasing said stabilizing flaps downwardly into the airstream beneath said wing, a pilot operated member for operating said elevator surface, and means controlled by said member for operating said stabilizing flaps by movement of said member to elevate said elevator surface whenever said stabilizing flaps are deflected by their biasing means below a predetermined angle relative to said wing.

13. An all wing airplane which is longitudinally unstable over at least a portion of its speed range including forward and rearward wing portions forming a wing of low aspect ratio, said forward portion having a generally curvilinear leading edge, to tractive propellers mounted forward of said leading edge adjacent lateral extremities thereof and said rearward portion possessing a faired plan marginal configuration with generally convex lateral edges, and having a reentrant trailing edge forming a flap receiving recess extending on opposite sides of the longitudinal axis of the wing, stabilizing flap means located in said recess on opposite sides of said longitudinal center line and in said propeller slipstreams, said flap means having trailing edges conforming to the plan form curvilinear extensions of the trailing edges of the non-reentrant trailing edge portions outboard of said recess, and means for constantly biasing said flap means downwardly into the airstream flowing beneath said wing for automatically changing the angle of attack of the airplane an amount sufficient to return the airplane to its predetermined trim speed upon any departure of the airplane from said trim speed.

14. An all wing airplane which is longitudinally unstable over at least a portion of its speed range including forward and rearward wing portions forming a wing of low aspect ratio, said forward portion having a leading edge from which propeller nacelles project adjacent the lateral extremities thereof and merge into generally curvilinear lateral edges, said lateral edges in turn merging into said rearward portion, and said rearward portion having a generally curvilinear plan marginal configuration which has at its trailing edge a reentrant portion extending laterally on either side of the longitudinal axis of the wing, propellers mounted on the forward portions of said nacelles, stabilizing flap means located in said reentrant portion on opposite sides of said longitudinal axis and extending laterally into the slipstreams from said propellers, said flap means being pivoted to the wing at the base of said reentrant portion and having a trailing edge outline which conforms to plan form curvilinear extensions of the non-reentrant trailing edge portions of said wing outboard of said flap, and means for biasing said flap means downwardly into the airstream flowing beneath said wing for automatically changing the angle of attack of the airplane an amount sufficient to return the airplane to its predetermined trim speed upon any departure of the airplane from said trim speed.

CHARLES H. ZIMMERMAN.

REFERENCES CITED

The following references are of record in the file of this patent:

UNITED STATES PATENTS

| Number | Name | Date |
|---|---|---|
| 1,981,700 | Hoffman | Nov. 20, 1934 |
| 2,108,093 | Zimmerman | Feb. 15, 1938 |
| 2,147,638 | DePort | Feb. 21, 1939 |
| 2,191,842 | Back | Feb. 27, 1940 |
| 2,205,610 | Van Nes | June 25, 1940 |

FOREIGN PATENTS

| Number | Country | Date |
|---|---|---|
| 375,900 | Italy | Oct. 25, 1939 |
| 474,065 | Great Britain | Jan. 17, 1936 |
| 642,042 | Germany | Feb. 20, 1937 |
| 740,210 | France | Nov. 12, 1932 |

Certificate of Correction

Patent No. 2,438,309.  March 23, 1948.

CHARLES H. ZIMMERMAN

It is hereby certified that errors appear in the printed specification of the above numbered patent requiring correction as follows: Column 6, line 68, for the words "upon the" read *upon any*; column 8, line 60, after "and" insert *aft*; column 9, line 35, for "to tractive" read *two tractive*; and that the said Letters Patent should be read with these corrections therein that the same may conform to the record of the case in the Patent Office.

Signed and sealed this 25th day of May, A. D. 1948.

[SEAL]

THOMAS F. MURPHY,
*Assistant Commissioner of Patents.*